US008744891B1

(12) United States Patent
Medina, III

(10) Patent No.: US 8,744,891 B1
(45) Date of Patent: Jun. 3, 2014

(54) SYSTEMS AND METHODS FOR DYNAMIC BUSINESS DECISION MAKING

(75) Inventor: Reynaldo Medina, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1018 days.

(21) Appl. No.: 11/828,982

(22) Filed: Jul. 26, 2007

(51) Int. Cl.
G06Q 10/00 (2012.01)
G06Q 30/00 (2012.01)

(52) U.S. Cl.
USPC .......................... 705/7.26; 705/7.27; 705/7.32

(58) Field of Classification Search
USPC ................................................ 705/7.11–7.42
See application file for complete search history.

(56) References Cited

U.S. PATENT DOCUMENTS

| | | | | |
|---|---|---|---|---|
| 7,379,885 B1* | 5/2008 | Zakim | ................................ | 705/2 |
| 7,493,264 B1* | 2/2009 | Kelly et al. | ........................ | 705/2 |
| 7,966,316 B2* | 6/2011 | Cao et al. | ........................ | 707/721 |
| 2002/0032694 A1* | 3/2002 | Zawadzki et al. | ............ | 707/500 |
| 2002/0035486 A1* | 3/2002 | Huyn et al. | ........................ | 705/3 |
| 2002/0111835 A1* | 8/2002 | Hele et al. | ........................ | 705/4 |
| 2002/0184265 A1* | 12/2002 | Gupta | ............................ | 707/513 |
| 2003/0036940 A1* | 2/2003 | Leymann et al. | ................. | 705/8 |
| 2004/0044528 A1* | 3/2004 | Chelba et al. | ................. | 704/249 |
| 2004/0059200 A1* | 3/2004 | Iliff | ................................ | 600/300 |
| 2005/0050464 A1* | 3/2005 | Vasey | ............................ | 715/517 |
| 2005/0283474 A1* | 12/2005 | Francis et al. | .................... | 707/5 |
| 2006/0161457 A1* | 7/2006 | Rapaport et al. | ................. | 705/2 |
| 2006/0257840 A1* | 11/2006 | Risch et al. | .................... | 434/323 |
| 2007/0118398 A1* | 5/2007 | Perls | ................................ | 705/2 |
| 2007/0214032 A1* | 9/2007 | Sciuk | ................................ | 705/8 |
| 2008/0086439 A1* | 4/2008 | Brough et al. | .................... | 706/47 |
| 2008/0162256 A1* | 7/2008 | Moore et al. | .................... | 705/10 |
| 2008/0227066 A1* | 9/2008 | Beygelzimer et al. | ........ | 434/238 |
| 2008/0262872 A1* | 10/2008 | Perry et al. | ........................ | 705/3 |

OTHER PUBLICATIONS

Oracle "Oracle Data Mining Concepts" (May 2008) (http://download.oracle.com/docs/cd/B28359_01/datamine.111/b28129/algo_decisiontree.htm).*

"About Mindbox®", [online]. © 2007 Mindbox, Inc. [retrieved on Jul. 9, 2007]. Retrieved from the Internet: <URL: http://www.mindbox.com/CompanyRoot.aspx>, 1 pg.

"Building Flexible Enterprise Processes Using Oracle Business Rules and BPEL Process Manager", *An Oracle White Paper*, (Jan. 2005), 11 pgs.

(Continued)

*Primary Examiner* — Sujay Koneru
(74) *Attorney, Agent, or Firm* — Brooks, Cameron & Huebsch, PLLC

(57) ABSTRACT

A system comprises one or more modules to access a business rule, deconstruct the business rule into a condition and an associated action, determine a set of questions relevant to the condition, place the set of questions into a question queue, order the question queue, and present the question queue to a user. A system comprises one or more modules to determine a subject of the request received from a user, use the subject to obtain a set of relevant questions, examiner each question and determine whether an answer to a current question is available in a storage area, and present the current question when the answer is not available. A system comprises one or more modules to access a decision tree, determine a current node, determine an estimated number of nodes between the current node and a leaf node, and present a representation using the estimated number of nodes.

6 Claims, 7 Drawing Sheets

(56) References Cited

OTHER PUBLICATIONS

"Business Rules and Web Architecture: W3C Creates Rule Interchange Format WG.", [online]. Nov. 9, 2005, Cover Pages. [retrieved on Jun. 13, 2007]. Retrieved from the Internet: <URL: http://xml.coverpages.org/ni2005-11-09-a.html>, 8 pgs.

"Business Rules Engine", [online]. Wikipedia. [retrieved on Jun. 13, 2007]. Retrieved from the Internet: <URL: http://en.wikipedia.org/wiki/Business_rules_engine>, 3 pgs.

"Business Rules Markup Language (BRML)", [online]. Nov. 5, 2002, Cover Pages. [retrieved on Jun. 13, 2007]. Retrieved from the Internet: <URL: http://xml.coverpages.org/brml.html>, 5 pgs.

"CiteSeer—List of Citations", [online]. [retrieved on Jul. 9, 2007]. Retrieved from the Internet: <URL: http://citeseer.ist.psu.edu/beulen98automatic.html>, 2 pgs.

"CRM and Interactive Selling Solutions from ILOG", [online]. © 1987-2007 ILOG. [retrieved on Jul. 9, 2007]. Retrieved from the Internet: <URL: http://www.ilog.com/solutions/business/crm/>, 2 pgs.

"Decision Tree", [online}. Wikipedia. [retrieved on Jul. 9, 2007]. Retrieved from the Internet: <URL: http://en.wikipedia.org/wiki/Decision_tree>, 5 pgs.

"ILOG JRules", [online]. © 1987-2007 ILOG, Inc. [retrieved on Jun. 13, 2007]. Retrieved from the Internet: <URL: http://www.ilog.com/products/jrules/?acc=ggmarcomus&gp=keybr&source=cpc&cmpn=keybr&gclid=CPy9-L3-plwCFQ9PWAod7RaRPA>, 2 pgs.

"ILOG: Business Rule Management, Rules Engine, Optimization and Visualization Software", [online]. © 1987-2007 ILOG, Inc. [retrieved on Jul. 9, 2007]. Retrieved from the Internet: <URL: http://www.ilog.com>, 1 pg.

"Mindbox® Home Page", [online]. ©2007 Mindbox®. [retrieved on Jul. 9, 2007]. Retrieved from the Internet: <URL: http://www.mindbox.com>, 1 pg.

"Oracle Business Rules", *Oracle Slideshow Presentation*, (prior to Jun. 7, 2000), 34 pgs.

"Oracle Business Rules: Technical Overview", *An Oracle White Paper*, (Feb. 2007), 23 pgs.

"Oracle® Business Rule's User's Guide", [online]. © 2005 Oracle. [retrieved on Jun. 13, 2007]. Retrieved from the Internet: <URL: http://download-east.oracle.com/docs/cd/B31017_01/web.1013/b28965/toc.htm>, 6 pgs.

"Ratabase® Brochure", (prior to Jun. 6, 2007), 6 pgs.

"Rule Enabling Applications With Oracle Business Rules", *An Oracle White Paper*, (Sep. 2005), 21 pgs.

"Underwriting", [online]. Wikipedia. [retrieved on Jul. 9, 2007]. Retrieved from the Internet: <URL: http://en.wikipedia.org/wiki/Underwriter>, 3 pgs.

Beulen, K., et al., "Automatic Question Generation for Decision Tree Based State Tying", *Proceedings of the 1998 IEEE International Conference on Acoustics, Speech, and Signal Processing (ICASSP '98)*, (1998), 805-808.

Kunderu, K. K. V., et al., "Creating an Automated Questionnaire Using NI LabVIEW 7 Express and LabVIEW PDA Module", [online]. © National Instruments Corporation. [retrieved on Jun. 13, 2007]. Retrieved from the Internet: <URL: http://sine.ni.com/csol/cds/item/vw/p/id/559/nid/124100>, 2 pgs.

Zahorian, S. A., et al., "Question Model for Intelligent Questioning Systems in Engineering Educaiton", *Proceedings, 31st ASEE/IEEE Frontiers in Education Conference (Session T2B)*, (Oct. 10-13, 2001, Reno, NV), (2001), pp. T2B-7-T2B12.

\* cited by examiner

US 8,744,891 B1

SYSTEMS AND METHODS FOR DYNAMIC BUSINESS DECISION MAKING

TECHNICAL FIELD

Various embodiments described herein relate generally to computer systems, and more particularly, but not by way of limitation, to systems and methods for dynamic business decision making.

BACKGROUND

Wide-area networks, including world-wide networks, such as the Internet, have become essential tools for personal and business use. As consumers continue to gain familiarity and comfort using online tools, such as Internet browsers, email, and real-time communication tools, business can continue to expand services. For example, using the Internet to supplement traditionally human-supplied services, such as customer support and order processing, businesses can provide goods and services at lower costs and consumers can gain certain advantages, such as 24-hour accessibility or multi-lingual capabilities. As technology increases in complexity, more intelligent systems become possible.

SUMMARY

Systems and methods for dynamic business decision making are described. In an embodiment, a system comprises a first module configured to access a business rule; a second module configured to deconstruct the business rule into a condition and an associated action; a third module configured to determine a set of questions relevant to the condition; a fourth module configured to place the set of questions into a question queue; a fifth module configured to order the question queue; and a sixth module configured to present the question queue to a user.

In an embodiment, a system comprises a first module configured to receive a request from a user; a second module configured to determine a subject of the request; a third module configured to use the subject to obtain a set of relevant questions; a fourth module configured to determine, for each question in the set of relevant questions, whether an answer to a current question is available in a storage area; and a fifth module configured to present the current question to the user when the answer to the current question is not available in the storage area.

In an embodiment, a system comprises a first module configured to access a decision tree, wherein the decision tree is organized using a first question as a root node and a plurality of terminal questions as leaf nodes; a second module configured to determine a current node of the decision tree, wherein the current node corresponds with a current question being presented to a user in a user-interface; a third module configured to determine an estimated number of nodes between the current node and a leaf node; and a fourth module configured to present a representation using the estimated number of nodes in the user-interface. Other embodiments are described.

DETAILED DESCRIPTION

The following detailed description includes references to the accompanying drawings, which form a part of the detailed description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

System Overview

Figure 1:
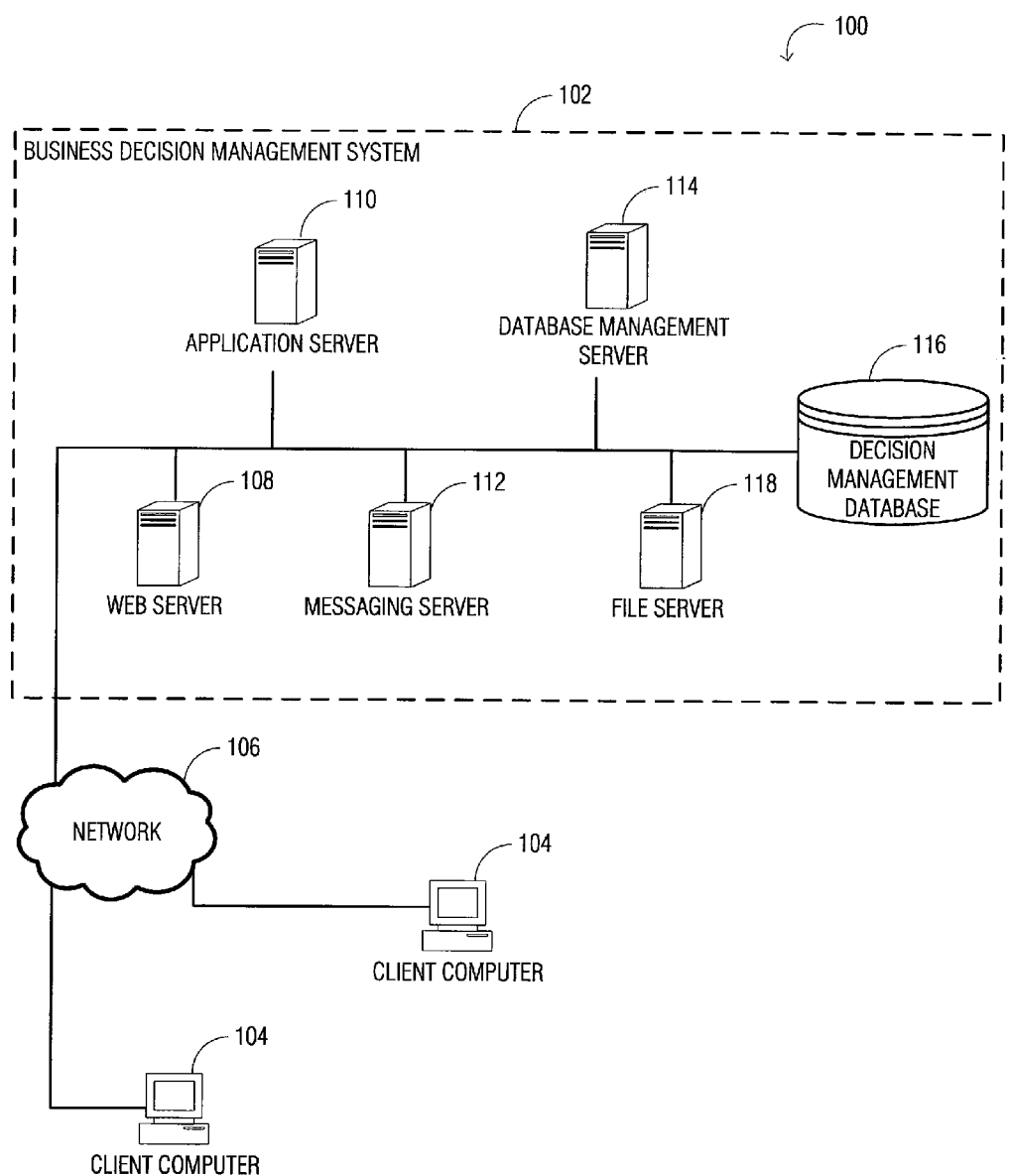
FIG. 1 is a schematic view of a computer network system according to various embodiments.

FIG. 1 is a schematic view of a computer network system 100 according to various embodiments. The computer network system 100 includes a business decision management system 102 and a client computer 104, communicatively coupled via a network 106. In an embodiment, the business decision management system 102 includes a web server 108, an application server 110, a messaging server 112, a database management server 114, which is used to manage at least a decision management database 116, and a file server 118. The business decision management system 102 may be implemented as a distributed system, for example one or more elements of the business decision management system 102 may be located across a wide-area network from other elements of the business decision management system 102. As another example, a server (e.g., web server 108, file server 118, database management server 114) may represent a group of two or more servers, cooperating with each other, in providing a pooled, distributed, or redundant computing model.

The network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices coupled to the network 106 may be coupled to the network 106 via one or more wired or wireless connections.

The web server 108 may communicate with the file server 118 to publish or serve files stored on the file server 118. The web server 108 may also communicate or interface with the application server 110 to enable web-based presentation of information. For example, the application server 110 may consist of scripts, applications, or library files that provide primary or auxiliary functionality to the web server 108 (e.g., multimedia, file transfer, or dynamic interface functions). In addition, the application server 110 may also provide some or the entire interface for the web server 108 to communicate with one or more of the other servers in the decision management system 102, e.g., the messaging server 112 or the database management server 114.

The application server 110 may also include a business rules application platform to create, manage, and administer business rules. The business rules application platform may include commercial packages, such as ORACLE BUSINESS RULES of ORACLE CORP. of Redwood Shores, Calif.

The decision management database 116 may include data to manage business rules, manage question templates, manage decision trees, or manage users' answers or other user data. The document management database 116 may be implemented as a relational database, a centralized database, a distributed database, an object oriented database, or a flat database in various embodiments.

In an embodiment, a user (not shown) at a client computer 104 may interface with the decision management system 102, such as by using the web server 108, to initiate an activity. The activity may include financial activities (e.g., loan approval or pre-approval, insurance coverage or changes, investment account changes, or banking services). The activity may also include other types of customer relations activities, such as order processing, account activation, account access, routine security checks, or surveys. The user may be presented one or more questions with relevant options for answers using user-interface elements, such as drop down lists, check boxes, radio buttons, text input fields, or the like. The user-interface may be implemented using a variety of programming languages or programming methods, such as HTML, VBScript, JavaScript, XML, XSLT, AJAX, Java, and Swing.

Figure 2:
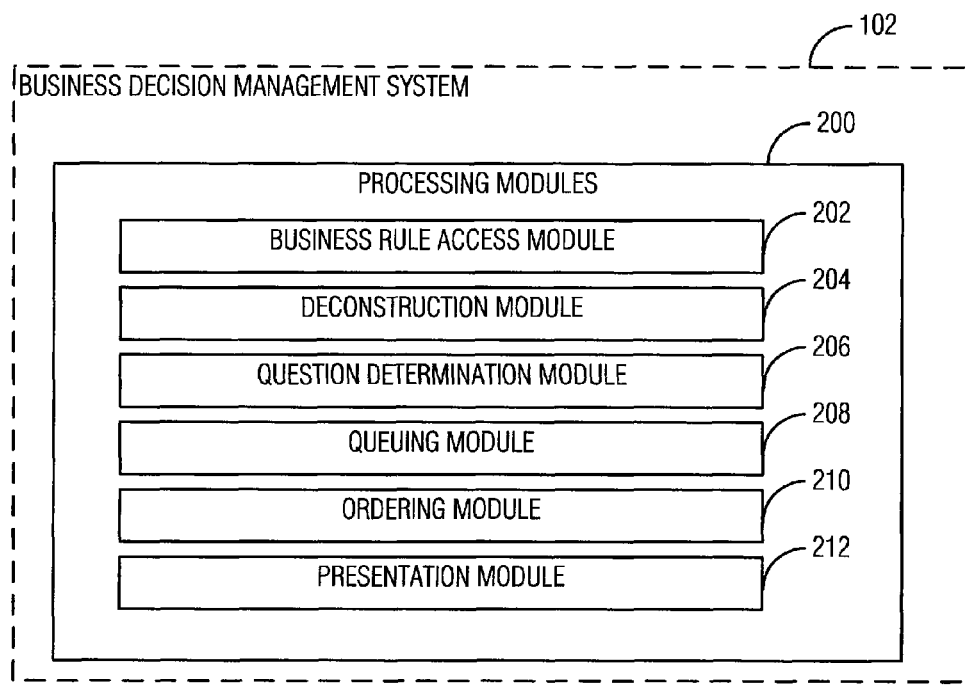
FIG. 2 is a block diagram of processing modules of the online document system shown in FIG. 1 according to various embodiments.
Figure 3:
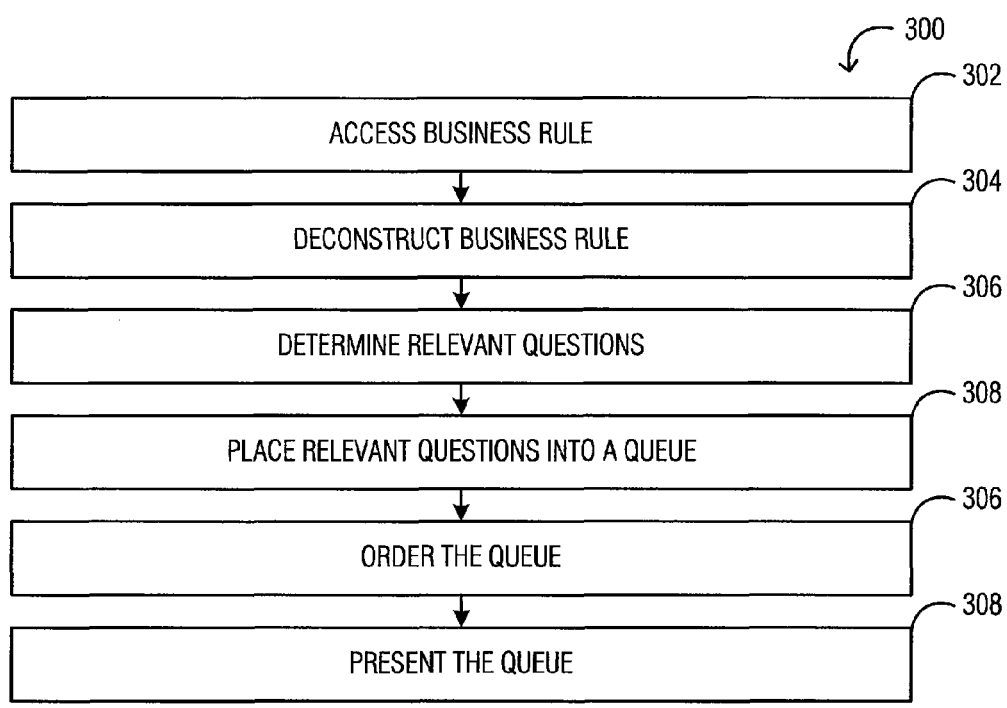
FIG. 3 is a flowchart illustrating a method according to various embodiments.

In various embodiments, the decision management system 102 may use a business rule, which may be defined using the application server 110, to develop a set of relevant questions to query a user and obtain information needed to resolve the business rule. FIGS. 2 and 3 generally describe systems and processes that may perform such tasks. In some embodiments, processes are implemented as instructions on computer-readable medium.

FIG. 2 is a block diagram of processing modules 200 of the decision management system 102 shown in FIG. 1, according to various embodiments. The processing modules 200 include a first module 202 to access a business rule, a second module 204 to deconstruct the business rule into a condition and an associated action, a third module 206 to determine a set of questions relevant to the condition, a fourth module 208 to place the set of questions into a question queue, a fifth module 210 to order the question queue, and a sixth module 212 to present the question queue to a user.

The first module 202 accesses a business rule. In an embodiment, the business rule is accessed via the application server 110. For example, a user (e.g., a business rules administrator) may use a software application to define and manage business rules. In general, a business rule may be constructed using one or more conditions and one or more resulting actions. For example, in an insurance underwriting context, a business rule may be "if applicant_age>18 and applicant_smoker=no, then pre-approve=true". This example includes a compound condition (e.g., the applicant's age must be over eighteen and the applicant must be a non-smoker), which must evaluate to TRUE for the resulting condition to occur (e.g., the applicant is pre-approved for insurance).

Business rules may vary in complexity. For example, rules may be dependent on each other, rules may be nested, or rules may use advanced comparison operations, such as selection from lists, sub-string searches, or regular expression tests.

The second module 204 deconstructs the business rule into a condition and an associated action. In an embodiment, the condition comprises a compound condition. One or more conditional statements may be used to describe a business rule (e.g. if-then constructs, if-then-else constructs, if-then-elseif constructs, switch or case constructs, or the like). The business rule may be deconstructed into several conditions and/or several associated actions.

The third module 206 determines a set of questions relevant to the condition. As a continuing example, a question relevant to the business rule illustrated above may be "How old are you?" or "Are you over the age of 18?" Additional questions may be "Are you a smoker?" or "Have you ever smoked or used tobacco products?" How the question is phrased may be determined by several factors, such as an anticipated use of the information in the future, for example, a more general question of "How old are you?" or "What is your birth date?" may result in more useful information that can be reused as opposed to a simpler question of "Are you over the age of 18? In addition, the question may be phrased in a particular way to reflect a business policy or risk policy. In the example illustrated, the underwriters may wish to know whether the applicant has ever used a tobacco product as that may provide more insight on the applicant's insurability than if they are a current smoker, or vice versa.

The fourth module 208 places the set of questions into a question queue. The question queue may be a list of questions (e.g., a text file) or an organization of structured data (e.g., a table in a database). The question queue may be implemented in computer memory, such as by using a programmed data structure (e.g., a linked list, queue, array, tree, or other such data structure). As an example, a business rule may contain a conditional statement that is deconstructed into five conditions by the second module 204 and translated to five questions by the third module 206. Each question may then be stored in a question queue implemented as a linked list by the fourth module.

The fifth module 210 orders the question queue. In an embodiment, the fifth module is configured to order the question queue using a dependency between a first question and a second question in the question queue. For example, dependencies may be based on business rules or policies, organizational rules, logical progression, or question scope. As an example, if a particular type of insurance is only offered to senior citizens (e.g., people age 65 and older) then other questions associated with additional conditions in a business rule may be inapplicable once the applicant's age is determined. Thus, an inherent dependency may exist in a business rule when represented as a compound conjunctive Boolean statement. As an alternative example, in a compound disjunctive Boolean statement, fewer or no dependencies may be present. Other types of dependencies may be used, alone or in combination with dependencies described, to order the question queue. In an embodiment, the fifth module is configured to order the question queue by ordering questions from a generally broadest scope to a generally narrowest scope. For example, when screening applicants for an insurance or other financial product, questions may be ordered in such a manner to dispose of unqualified applicants in the most efficient manner (e.g., presenting questions that may disqualify the largest pool of typical applicants before presenting other questions).

The sixth module 212 presents the question queue to a user. The questions in the question queue may be presented one at a time (e.g., from the beginning of the queue and moving toward the end) or more than one at a time. For example, when separate lines of questions may be determined from all the questions in the question queue, multiple questions may be presented to make the inquiry process more efficient. As an example, if the questions in a question queue include questions related to both an applicant's residence and an applicant's prior driving record, with several questions associated with each topic, the sixth module 212 may present non-dependent questions for each topic to a user at the same time.

In a further embodiment, processing modules 200 may include a seventh module to receive a response from the user, an eighth module to determine a subsequent question using the response, and a ninth module to present the subsequent question. After a user answers a question, the processing modules 200 may validate the answer (e.g., performing a constraint check, a sanity check, or checks based on business rules or expected replies). The eighth module may then obtain the next question from the question queue. As described above, the next question may be dependent on the question asked. In such a case, the business rule (conditional statement) may be evaluated after each question is presented and answered. This type of operation may short-circuit the evaluation process and make the resulting decision available to the user quicker.

In a further embodiment, processing modules 200 may include a tenth module to store the question queue and an eleventh module to display the question queue using a tree graph representation. For example, a tree graph representation may incorporate each question as a node in the graph and the possible answers for each question as edges connecting nodes. If there are dependent questions (nodes) then they may be represented as descendent nodes connected by a particular edge that represents the answer to the ancestor node that would navigate a user to that particular question in the descendent node. In an embodiment, the tree graph representation comprises a plurality of tree graphs. For example, when there are multiple independent groups of questions, then these questions may be represented separately.

FIG. 3 is a flowchart illustrating a method 300 according to various embodiments. At 302, a business rule is accessed. At 304, the business rule is deconstructed into a condition and an associated action. In an embodiment, the condition comprises a compound condition. At 306, a set of questions relevant to the condition is determined. At 308, the set of questions is placed into a question queue. At 310, the question queue is ordered. In an embodiment, the question queue is ordered using a dependency between a first question and a second question in the question queue. In an embodiment, the question queue is ordered from a generally broadest scope to a generally narrowest scope. At 312, the question queue is presented to a user. In a further embodiment, a response is received from the user, a subsequent question is determined using the response, and the subsequent question is presented to the user. In a further embodiment, the question queue is stored and then displayed using a tree graph representation. In an embodiment, the tree graph representation comprises a plurality of tree graphs.

Figure 4:
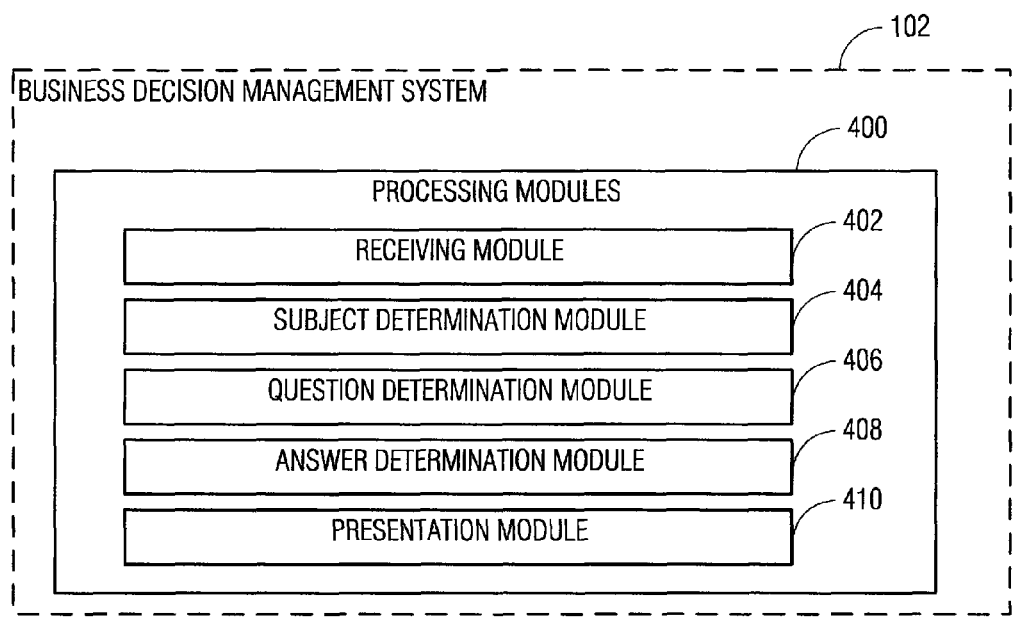
FIG. 4 is a block diagram of processing modules of the online document system shown in FIG. 1 according to various embodiments.
Figure 5:
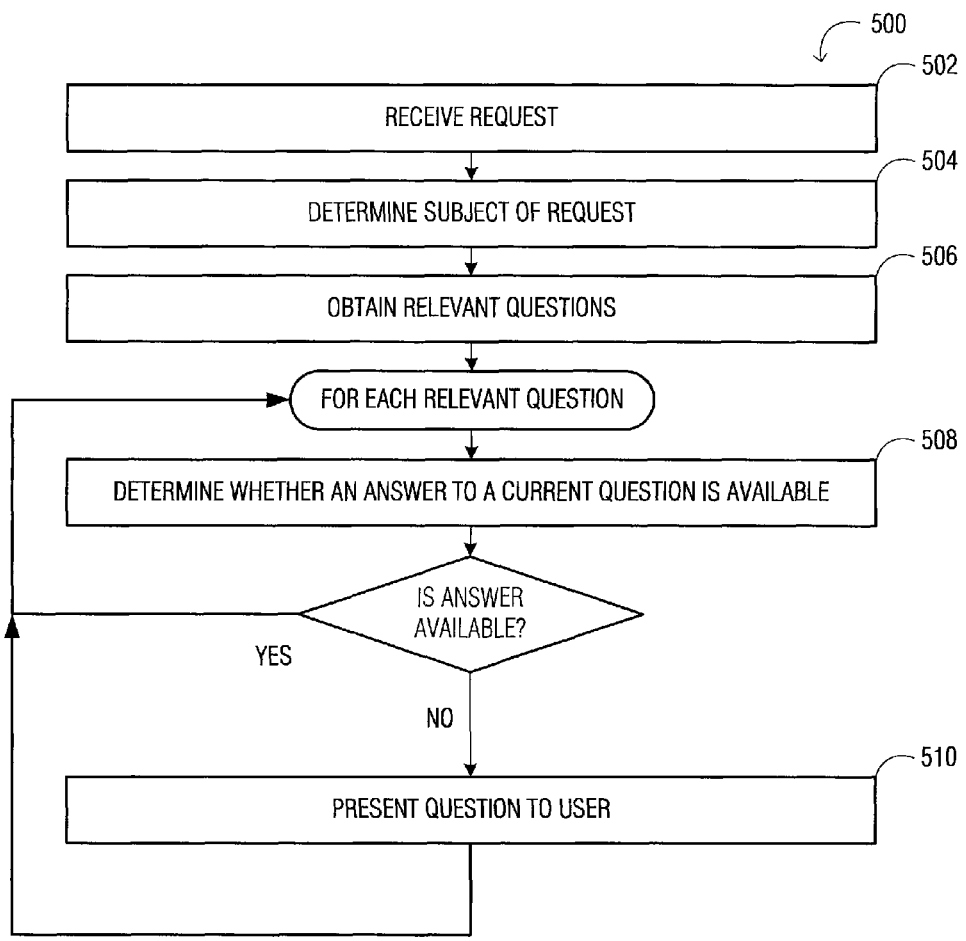
FIG. 5 is a flowchart illustrating a method according to various embodiments.

In various embodiments, the decision management system 102 may use a decision tree that reflects a business rule when presenting questions to a user. FIGS. 4 and 5 generally describe systems and processes that may perform such tasks. In some embodiments, processes are implemented as instructions on computer-readable medium.

FIG. 4 is a block diagram of processing modules 400 of the decision management system 102 shown in FIG. 1, according to various embodiments. The processing modules 400 include a first module 402 to receive a request from a user, a second module 404 to determine a subject of the request, a third module 406 to use the subject to obtain a set of relevant questions, a fourth module 408 to determine, for each question in the set of questions, whether an answer to a current question is available in a storage area, and a fifth module 410 to present the current question to the user when the answer to the current question is not available in the storage area.

The first module 402 receives a request a request from a user. As an illustrative example, a user may interface with the business decision management system 102 using a client computer 104. A web page, or other dynamic content, may be presented to the user, for example, via the web server 108, application server 110, database management server 114, or file server 118, either alone or in combination. The user may be presented with pre-formed questions (e.g., using a drop-down list) or may be enabled to enter a question of their own (e.g., using a text input field).

The second module 404 determines a subject of the request. By appropriately parsing a submitted question, the second module 404 may extract the subject of the request. For example, a request of "I would like to add my daughter to my health insurance?" may be reduced to a subject of "adding a minor to a health insurance policy." In various examples, the request may be a statement reflecting an intent or directive of a user or a question from the user. In some cases, there may be more than one subject in a request or more than one request containing at least one subject. For example, the request may contain "I would like to add my daughter as a beneficiary to my life insurance and increase my policy to $100,000." Here, the two subjects may be represented as "adding a beneficiary to a life insurance policy" and "changing the coverage of a life insurance policy." In such cases, the second module 404 may attempt to determine priority of requests or may simply query the user which request they would like to address first. In other examples, the second module 404 may continue processing each request-subject pair and make them accessible to the subsequent modules described below.

The third module 406 uses the subject to obtain a set of relevant questions. As an example, a subject of a request may be related to a business rule. To continue the previous example related to health insurance, a business rule may exist that can be represented as: "if health_insurance_plan=family_policy, then dependent_coverage". Other business rules may also exist that reflect the type of policies and their permitted use, the number of dependents in a family health policy, permitted previous health conditions and other conditions for coverage, and the like. To derive an appropriate set of relevant questions, the third module 406 may use related business rules to determine what information is needed to resolve the business decisions reflected in the related business rules. For example, in this situation, the type of policy that the policy-holder currently has is an important piece of information to ascertain. According to other business rules, the age of the person being added, their prior health history, their current health status, and other factors may be needed to fully assess the potential beneficiary before coverage may be offered. In an embodiment, the set of relevant questions is organized as a decision tree. For example, in some situations, such as in an insurance policy approval process, some answers may preclude others from being used or asked. The dependency between questions may be represented as a tree, where each node in the tree represents a question or a terminal state and each edge represents an answer to an ancestor question node to a descendent question node or a descendent terminal node. Terminal nodes (leaf nodes) may represent a final disposition of an initial query, which may be positioned as the root node.

The fourth module 408 determines, for each question in the set of questions, whether an answer to a current question is available in a storage area. The determination may be performed in a batch mode, for example, to obtain available answers for every relevant question, or in a series mode, obtaining answers to questions just prior to the question being presented (e.g., using the fifth module 410). Each mode may be more efficient or more practical than the other depending on the situation. For example, using the batch mode may only require using a single database connection. Once the data is retrieved, the database connection may be closed and any memory structures may be freed or released. On the other hand, in a series of questions, it may be faster to query a database for each question presented as needed than it would be to obtain results for every possible question to be presented. The design of the access and retrieval may also be a hybrid and use network response conditions, user experience, network load, system load, processor performance, or other metrics to automatically or semi-automatically shift from one mode to the other.

The fifth module 410 presents the current question to the user when the answer to the current question is not available in the storage area. In an example, the current question is retrieved from a data store (e.g., the decision management database 116). The question may be stored using an index or other identifier. The question may be formatted using a standardized interface language (e.g., eXtensible Markup Language (XML)). For example, a question may be formatted using XML and include the question string in a <question> block and the format of the answer input (e.g., radio button, check box, text input field, dropdown list, or the like) with associated labels or values in an <answer> block. Using a standardize interface language to store questions in a formatted manner may have advantages, such as cross-platform compatibility or dynamic implementation at the presentation layer.

In a further embodiment, the processing modules 400 include a sixth module to receive a response to the current question from the user and a seventh module configured to store the response in the storage area as the answer to the current question. As questions are presented and answered, the answers may be stored for later reference. In doing so, during later requests, the business decision management system 102 may perform fewer user-interrogations before ascertaining a final disposition of a user request.

In a further embodiment, the processing modules 400 include an eighth module configured to present a subsequent question to the user when the answer to the current question is available in the storage area. Skipping over questions where the answers are already available gains efficiencies in several ways—for example, the user is not burdened answering the same question for different requests and the system is not burdened by having to present redundant questions. In some cases, when the answer is found to be available in the storage area, the user may be presented with the stored answer and an opportunity to confirm or modify the stored answer to correct or discard it. For example, as a later step, the user may be presented with a summary page of information either asked contemporaneously or retrieved from storage to be used to determine the final disposition of the request.

In a further embodiment, the processing modules 400 include a ninth module configured to use a set of answers corresponding to the set of relevant questions to resolve the request. For example, after the answers are obtained or retrieved, the conditional statement in the associated business rule may be evaluated. In an embodiment, the request is related to an underwriting decision. For example, the request may be related to life insurance, health insurance, car insurance, or other types of insurance products. The request may be related to adding or removing beneficiaries, modifying coverage amounts, changing the term (e.g., in a term life policy), adding or removing a vehicle or coverage on a vehicle, or the like.

In a further embodiment, the processing modules 400 include a tenth module to present a subsequent question to the user by traversing the decision tree, when the answer to the current question is available in the storage area.

FIG. 5 is a flowchart illustrating a method 500 according to various embodiments. At 502, a request is received from a user. At 504, a subject of the request is determined. At 506, the subject is used to obtain a set of relevant questions. In an embodiment, the set of relevant questions is organized as a decision tree. For each question in the set of relevant questions, at 508, whether an answer to a current question is available in a storage area is determined and if not, then at 510 the current question is presented to the user. In a further embodiment, a response to the current question is received from the user and the response is stored in a storage area as the answer to the current question. In a further embodiment, a subsequent question is presented to the user when the answer to the current question is available in the storage area. In a further embodiment, a set of answers corresponding to the set of relevant question is used to resolve the request. In an embodiment, the request is related to an underwriting decision. In a further embodiment, a subsequent question is presented to the user by traversing the decision tree, when the answer to the current question is available in the storage area.

Embodiments using examples of insurance are described, however, systems and methods described herein may be used to dynamically present questions associated with business rules related to any type of business, such as banking services, financial services, customer service, technical support, or other decision support systems.

Figure 6:
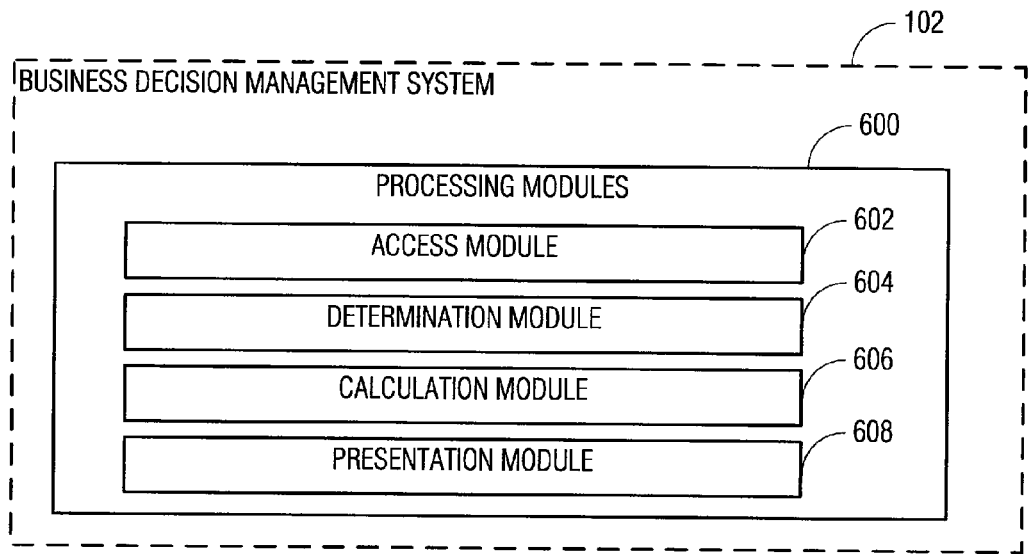
FIG. 6 is a block diagram of processing modules of the online document system shown in FIG. 1 according to various embodiments.
Figure 7:
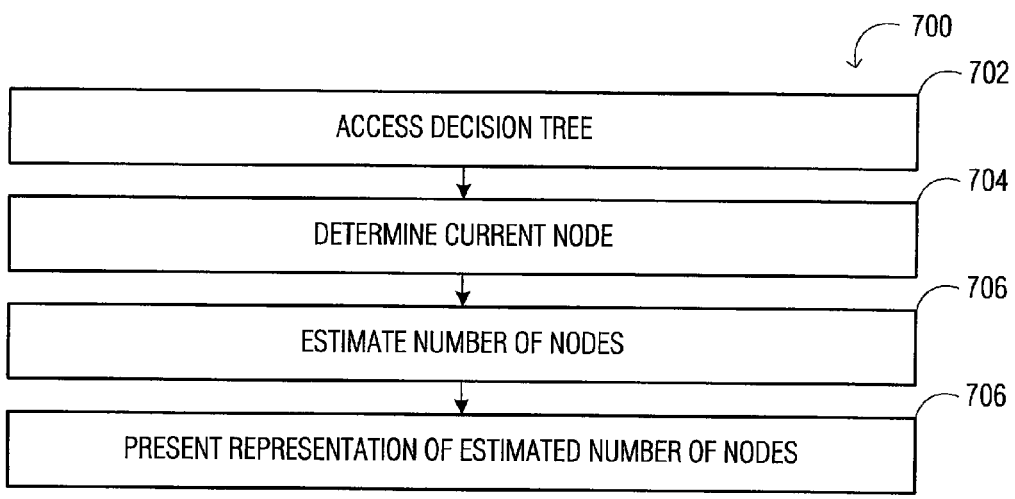
FIG. 7 is a flowchart illustrating a method according to various embodiments.

While FIGS. 2-5 illustrate embodiments in which a user may interact with a decision management system 102, FIGS. 6 and 7 generally describe systems and processes that provide an indication of progression through an automated or semi-automated process, such as those described above. In some embodiments, processes are implemented as instructions on computer-readable medium.

FIG. 6 is a block diagram of processing modules 600 of the decision management system 102 shown in FIG. 1, according to various embodiments. The processing modules 600 include a first module 602 to access a decision tree, a second module 604 to determine a current node of the decision tree, a third module 606 to determine an estimated number of nodes between the current node and a leaf node, and a fourth module 608 to present a representation using the estimated number of nodes in the user-interface.

The first module 602 accesses a decision tree. In an embodiment, the decision tree is organized using a first question as a root node and a plurality of terminal questions as leaf nodes. A terminal question, in an example, may be the last question in a series of related questions.

The second module 604 determines a current node of the decision tree. In an example, the default node used is the root node. In an embodiment, the current node corresponds with a current question being presented to a user in a user-interface.

The third module 606 determines an estimated number of nodes between the current node and a leaf node. For example, a tree traversal process may be used (e.g., breadth-first or depth-first traversal) and a record may be kept of the deepest leaf node (e.g., the leaf node farthest from the current node or the root node).

In an embodiment, the third module is further configured to determine the estimated number of nodes between the current node and the leaf node by: determining a maximum number of edges to a farthest node from the current node; determining a minimum number of edges to a nearest node from the current node; and averaging the maximum and minimum number of edges. The farthest node may be a terminal node. In an example, the farthest node is the farthest node in a particular branch of the decision tree where the root of the branch is defined by the current node.

In an embodiment, the third module is further configured to determine the estimated number of nodes between the current node and the leaf node by: determining a most probabilistic path from the current node to a most probabilistic leaf node; and counting the number of edges between the current node and the most probabilistic leaf node.

The most probabilistic path may be determined by analyzing previous user responses to determine a most likely answer to each node (question) in the decision tree and obtaining a most likely path through the tree from a given node. In an embodiment, the third module is further configured to determine the most probabilistic path by: accessing a database of user responses to the question corresponding to the current node; determining a most popular response; traversing the decision tree using the most popular response; and performing the accessing, determining, and traversing on subsequent interior nodes until a leaf node is reached.

Other information may be used to determine the probability of an answer for a given question (node), such as demographic data of the user. For example, it may be determined that a user of a particular age with a particular income may be more or less likely to be interested in a particular investment product (e.g., an aggressive mutual fund versus a conservative money market account). In an embodiment, the third module is further configured to determine the most probabilistic path by: accessing a database of demographic data; determining a most likely response using the demographic data; traversing the decision tree using the most likely response; and performing the accessing, determining, and traversing on subsequent interior nodes until a leaf node is reached.

The fourth module 608 presents a representation using the estimated number of nodes in the user-interface. The representation may include the number of node already visited along with the number of estimated nodes. In such a presentation, the user would be aware of how many steps they have completed with an estimate of how many steps remain in a current interview.

In a further embodiment, the processing modules 600 include a fifth module to traverse the decision tree to a subsequent node after the current question is answered, a sixth module to increment a counter representing the number of nodes visited, and a seventh module to decrement a counter representing an estimated number of nodes remaining.

In a further embodiment, the processing modules 600 include a module to traverse the decision tree to a subsequent node using data from a data source, a module to increment a counter representing the number of nodes visited, and a module to decrement a counter representing an estimated number of nodes remaining. As a user answers additional questions, the number of nodes visited will increase linearly and similarly, the number of nodes remaining may decrease linearly. However, this may not be so in a practice as the user moves through the decision tree. For example, after a user answers a particular question associated with a node, a larger branch of possible nodes may be avoided when a particular answer is obtained, leaving the user with a smaller branch of possible nodes and resulting in a reduced number of possible steps remaining in the interview. To address this type of situation where a user's answer affects changes the topology of the decision tree that may be subsequently visited, the following embodiments are described.

In a further embodiment, the processing modules 600 include an eighth module to traverse the decision tree to a subsequent node using data from a data source, and a ninth module to determine an estimated number of nodes between the subsequent node and a leaf node. For example, when a user's data is already available in the business decision management system 102, the question need not be presented and an answer need not be received from the user. The traversal of the decision tree may be accomplished without user assistance (automatically).

In a further embodiment, the processing modules 600 include a module to traverse the decision tree to a subsequent node after the current question is answered, and a module to determine an estimated number of nodes between the subsequent node and a leaf node.

FIG. 7 is a flowchart illustrating a method 700 according to various embodiments. At 702, a decision tree is accessed. In an embodiment, the decision tree is organized using a first question as a root node and a plurality of terminal questions as leaf nodes. At 704, a current node of the decision tree is determined. In an embodiment, the current node corresponds with a current question being presented to a user in a user-interface. At 706, an estimated number of nodes between the current node and a leaf node are determined.

In an embodiment, determining the estimated number of nodes between the current node and the leaf node comprises: determining a maximum number of edges to a farthest node from the current node; determining a minimum number of edges to a nearest node from the current node; and averaging the maximum and minimum number of edges.

In an embodiment, determining the estimated number of nodes between the current node and the leaf node comprises: determining a most probabilistic path from the current node to a most probabilistic leaf node; and counting the number of edges between the current node and the most probabilistic leaf node.

In an embodiment, determining the most probabilistic path comprises: accessing a database of user responses to the question corresponding to the current node; determining a most popular response; traversing the decision tree using the most popular response; and performing the accessing, determining, and traversing on subsequent interior nodes until a leaf node is reached.

In an embodiment, determining the most probabilistic path comprises: accessing a database of demographic data; determining a most likely response using the demographic data; traversing the decision tree using the most likely response; and performing the accessing, determining, and traversing on subsequent interior nodes until a leaf node is reached.

At 708, a representation using the estimated number of nodes in the user-interface is presented.

In a further embodiment, the decision tree is traversed to a subsequent node after the current question is answered, a counter representing the number of nodes visited is incremented, and a counter representing an estimated number of nodes remaining is decremented.

In a further embodiment, the decision tree is traversed to a subsequent node using data from a data source, a counter representing the number of nodes visited is incremented, and a counter representing an estimated number of nodes remaining is decremented.

In a further embodiment, the decision tree is traversed to a subsequent node using data from a data source and an estimated number of nodes between the subsequent node and a leaf node is determined.

In a further embodiment, the decision tree is traversed to a subsequent node after the current question is answered and an estimated number of nodes between the subsequent node and a leaf node is determined.

Hardware and Software Platform

Figure 8:
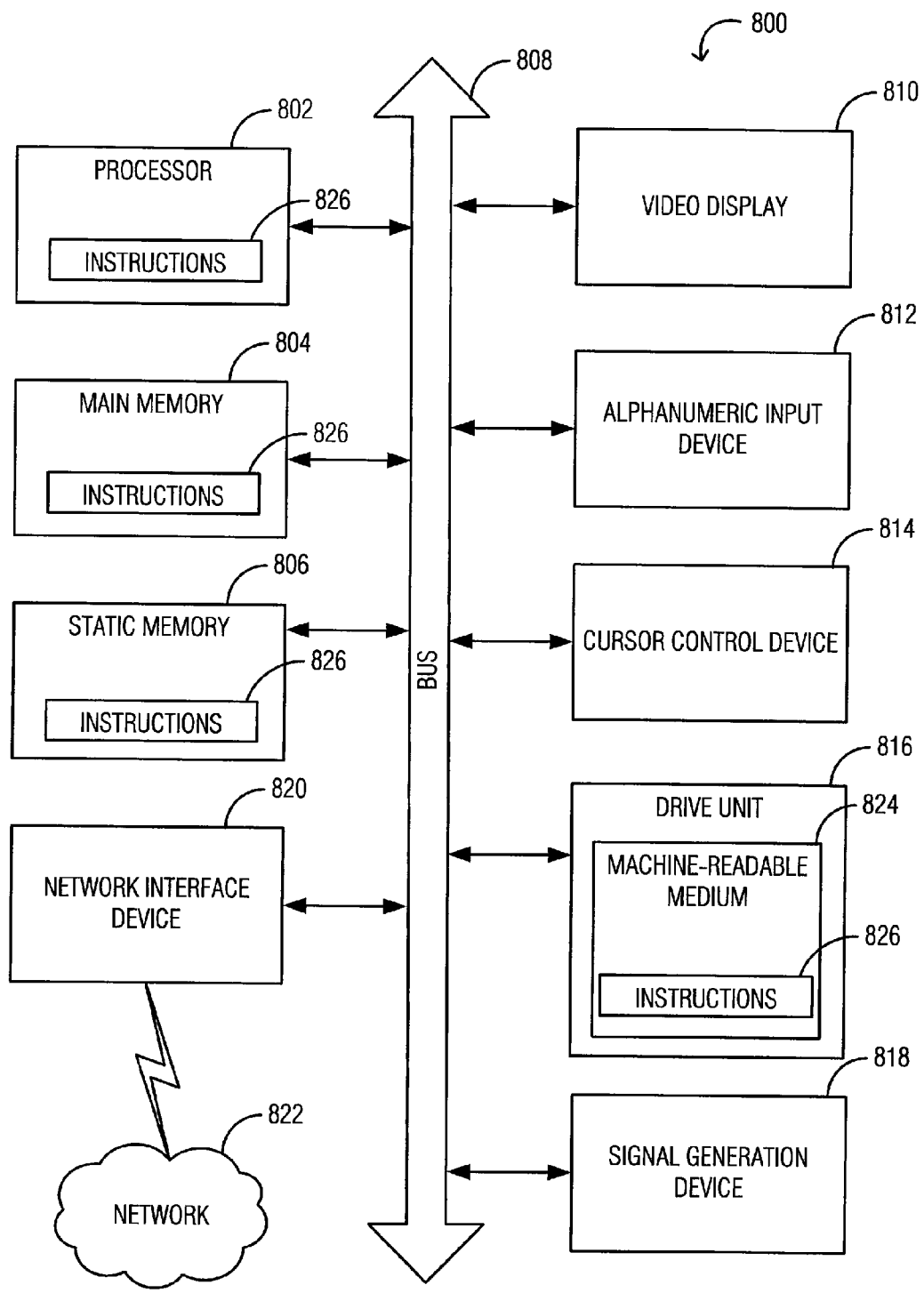
FIG. 8 is a block diagram illustrating a machine in the example form of a computer system, within which a set or sequence of instructions for causing the machine to perform any one of the methodologies discussed herein may be executed, according to various embodiments.

FIG. 8 is a block diagram illustrating a machine in the example form of a computer system 800, within which a set or sequence of instructions for causing the machine to perform any one of the methodologies discussed herein may be executed, according to various embodiments. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 800 includes a processor 802, a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820 to interface the computer system to a network 822.

The disk drive unit 816 includes a machine-readable medium 824 on which is stored a set of instructions or software 826 embodying any one, or all, of the methodologies described herein. The software 826 is also shown to reside, completely or at least partially, within the main memory 804 and/or within the processor 802. The software 826 may further be transmitted or received via the network interface device 820.

For the purposes of this specification, the term "machine-readable medium" or "computer-readable medium" shall be taken to include any medium which is capable of storing or encoding a sequence of instructions for execution by the machine and that cause the machine to perform any one of the methodologies. The terms "machine-readable medium" or "computer-readable medium" shall accordingly be taken to include, but not be limited to, solid-state memories, optical and magnetic disks, and other temporary, transient, or permanent storage means, such an executable streaming downloadable program. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. For example, one module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims.

What is claimed is:

1. A non-transitory computer-readable medium including instructions that, when performed by a computer, cause the computer to:
    access at least one underwriting business rule related to the determined subject, wherein the at least one underwriting business rule includes a conditional statement for the associated financial underwriting action and determines what information is required to resolve a underwriting business decision;
    deconstruct the at least one underwriting business rule into a compound condition and the associated financial underwriting action, wherein the compound condition includes at least two conditions that must be true to perform the associated financial underwriting action;

determine a set of questions relevant to the compound condition, including determining a phrasing of each question within the set of questions based on an anticipated use of information gathered from the set of questions wherein the anticipated use is related to the associated financial underwriting action;

place the set of questions into a question queue;

order the question queue, wherein the order includes presenting a disqualifying question within the set of questions prior to presenting the remaining questions within the set of questions;

organize a decision tree based on the order of the question queue;

access the decision tree, wherein the decision tree includes a number of nodes and the nodes represent the set of questions, including a first question as a root node and a plurality of terminal questions as leaf nodes;

determine a current node of the decision tree, wherein the current node corresponds with a current question presented to the user;

determine an estimated number of nodes between the current node and a leaf node to present to the user, wherein instructions to determine the estimated number of nodes between the current node and the leaf node is determined by a most probabilistic path from the current node to a most probabilistic leaf node and counts the number of edges between the current node and the most probabilistic leaf node; and validate a response to the current question from the user.

2. The non-transitory computer-readable medium of claim 1, further comprising instructions that cause the computer to:
receive a response from the user;
determine a subsequent question using the response; and
present the subsequent question.

3. The non-transitory computer-readable medium of claim 1, wherein ordering the question queue uses a dependency between a first question and a second question in the question queue.

4. The non-transitory computer-readable medium of claim 1, wherein ordering the question queue comprises ordering questions from a generally broadest scope to a generally narrowest scope.

5. The non-transitory computer-readable medium of claim 1, further comprising instructions that cause the computer to:
store the question queue; and
display the question queue using a tree graph representation.

6. The non-transitory computer-readable medium of claim 5, wherein the tree graph representation comprises a plurality of tree graphs.

* * * * *